US011276158B2

(12) United States Patent
Wen et al.

(10) Patent No.: US 11,276,158 B2
(45) Date of Patent: Mar. 15, 2022

(54) METHOD AND APPARATUS FOR INSPECTING CORROSION DEFECT OF LADLE

(71) Applicant: BEIJING BAIDU NETCOM SCIENCE AND TECHNOLOGY CO., LTD., Beijing (CN)

(72) Inventors: Yawei Wen, Beijing (CN); Jiabing Leng, Beijing (CN); Minghao Liu, Beijing (CN); Yulin Xu, Beijing (CN); Faen Zhang, Beijing (CN); Jiangliang Guo, Beijing (CN); Xu Li, Beijing (CN); Jin Tang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 274 days.

(21) Appl. No.: 16/351,291

(22) Filed: Mar. 12, 2019

(65) Prior Publication Data
US 2019/0362490 A1 Nov. 28, 2019

(30) Foreign Application Priority Data
May 25, 2018 (CN) .......................... 201810532052.1

(51) Int. Cl.
*G06T 7/00* (2017.01)
*G06N 20/00* (2019.01)
(Continued)

(52) U.S. Cl.
CPC ............ *G06T 7/0006* (2013.01); *G06K 9/628* (2013.01); *G06N 3/08* (2013.01); *G06N 20/00* (2019.01);
(Continued)

(58) Field of Classification Search
CPC .................. G06T 7/0006; G06T 7/001; G06T 2207/20081; G06T 2207/20084;
(Continued)

(56) References Cited

U.S. PATENT DOCUMENTS 7,171,039 B2 * 1/2007 Kondo .................... G06T 7/001
382/149
7,463,765 B2 * 12/2008 Messina ............... G01N 21/956
382/144
(Continued)

FOREIGN PATENT DOCUMENTS

CN 107392896 A 11/2017
CN 107403173 A 11/2017
(Continued)

OTHER PUBLICATIONS

"Vision-based Structural Inspection using Multiscale Deep Convolutional Neural Networks"; Hoskere, Vedhus; Computer Science—Computer Vision and Pattern Recognition (Year: 2018).*
(Continued)

*Primary Examiner* — Michael S Osinski
(74) *Attorney, Agent, or Firm* — Seed IP Law Group LLP

(57) ABSTRACT

A method and an apparatus for inspecting a corrosion defect of a ladle are provided. The method includes: acquiring images from various angles using an image acquisition apparatus inside a to-be-inspected ladle; and inputting the acquired images into a defect inspection system to obtain a label representing a defect category, the defect inspection system including: a deep convolutional neural network that predicts a category of a corrosion defect of the ladle included in the images based on the input images. This method has the advantages of high safety, high accuracy and high real-time performance in inspecting the ladle status.

15 Claims, 5 Drawing Sheets

(51) Int. Cl.
*G06K 9/62* (2006.01)
*G06N 3/08* (2006.01)

(52) U.S. Cl.
CPC .............. *G06T 2207/20081* (2013.01); *G06T 2207/20084* (2013.01); *G06T 2207/30164* (2013.01)

(58) Field of Classification Search
CPC . G06T 2207/30164; G06T 2207/30136; G06T 7/0004; G06K 9/628; G06K 9/036; G06K 9/6273; G06K 9/6268; G06K 9/6284; G06K 9/033; G06K 9/6256; G06K 9/6269; G06N 3/08; G06N 20/00; G06N 3/0454; G06N 3/084; G01N 21/8851; G01N 21/90; G01N 21/9036; G01N 21/909; G01N 2021/8854; G01N 2021/8887
See application file for complete search history.

(56) References Cited

U.S. PATENT DOCUMENTS

| | | | | |
|---|---|---|---|---|
| 8,107,726 | B2* | 1/2012 | Xu | G06T 7/162 |
| | | | | 382/173 |
| 9,524,542 | B1* | 12/2016 | Clark | G01N 21/8851 |
| 9,665,802 | B2* | 5/2017 | Wang | G06K 9/66 |
| 9,715,723 | B2* | 7/2017 | Shlain | G06K 9/6284 |
| 10,102,454 | B2* | 10/2018 | Merler | G06K 9/6285 |
| 10,147,176 | B1* | 12/2018 | Sones | G06T 1/0007 |
| 10,309,908 | B2* | 6/2019 | Kress | H04N 5/2256 |
| 10,654,606 | B2* | 5/2020 | Reed | B65C 1/021 |
| 2003/0202703 | A1* | 10/2003 | Ogi | G06T 7/0004 |
| | | | | 382/224 |
| 2004/0126015 | A1* | 7/2004 | Hadell | B66C 19/002 |
| | | | | 382/181 |
| 2008/0116358 | A1* | 5/2008 | Diehr | G01N 21/9054 |
| | | | | 250/221 |
| 2008/0291440 | A1* | 11/2008 | Sones | G01N 21/9036 |
| | | | | 356/240.1 |
| 2013/0247404 | A1* | 9/2013 | Garin | G01B 5/12 |
| | | | | 33/522 |
| 2013/0279794 | A1* | 10/2013 | Greenberg | G06T 7/001 |
| | | | | 382/149 |
| 2014/0029019 | A1* | 1/2014 | Leconte | G01N 21/90 |
| | | | | 356/632 |
| 2015/0112903 | A1* | 4/2015 | Chan | G06F 16/9027 |
| | | | | 706/12 |
| 2016/0187165 | A1* | 6/2016 | Leprat | G01B 5/06 |
| | | | | 33/542 |
| 2018/0322623 | A1* | 11/2018 | Memo | G06N 3/084 |
| 2018/0327192 | A1* | 11/2018 | Hamaguchi | B65G 43/08 |
| 2019/0252213 | A1* | 8/2019 | Koizumi | H01L 21/6723 |
| 2019/0340747 | A1* | 11/2019 | Wang | H01M 8/12 |
| 2020/0020435 | A1* | 1/2020 | Annavi | G16H 30/40 |
| 2020/0380656 | A1* | 12/2020 | Wendel | G06T 7/001 |

FOREIGN PATENT DOCUMENTS

| | | |
|---|---|---|
| CN | 107742107 A | 2/2018 |
| CN | 108061735 A | 5/2018 |
| EP | 3 065 086 A1 | 9/2016 |

OTHER PUBLICATIONS

"Intelligent corrosion detection and rating based on faster region-based convolutional neural network"; Xuebing Xu; 2020 Global Reliability and Prognostics and Health Management (PHM-Shanghai) (pp. 1-5) (Year: 2020).*

"Image Enhancement Based on Software Filter Optimization for Corrosion Inspection"; Syahril Anuar Idris; 2014 5th International Conference on Intelligent Systems, Modelling and Simulation (pp. 345-350) (Year: 2014).*

"Welding defect classification based on convolution neural network (CNN) and Gaussian kernel"; Agus Khumaidi ; 2017 International Seminar on Intelligent Technology and Its Applications (ISITIA) (pp. 261-265) (Year: 2017).*

* cited by examiner

METHOD AND APPARATUS FOR INSPECTING CORROSION DEFECT OF LADLE

CROSS-REFERENCE TO RELATED APPLICATIONS

This application claims priority to Chinese Patent Application No. 201810532052.1, filed on May 25, 2018, titled "Method and Apparatus for Inspecting Corrosion Defect of Ladle," which is hereby incorporated by reference in its entirety.

TECHNICAL FIELD

The present disclosure relates to the field of computer technology, specifically to the field of computer network technology, and more specifically to a method and apparatus for inspecting a corrosion defect of a ladle.

BACKGROUND

In the steel manufacturing industry, ladle is an important equipment for steelmaking, and its status is not only related to the quality of steel production, but also related to the safety of a production environment. Therefore, quality inspection for the ladle status is a key link in the steel production process. In the production environments of traditional iron and steel enterprises, an important means to monitor the ladle status is to inspect the status of the inner wall surface of the ladle to determine whether the ladle is defective, and to deal with the ladle based on the inspection result.

In the traditional iron and steel enterprise, the quality inspection based on the status of the inner wall surface of the ladle is mostly a manual inspection or semi-automated optical instrument auxiliary quality inspection. Existing quality inspection systems have two main approaches in defect classification applications. The first is pure manual quality inspection, which relies on industry experts to visually observe images of the production environment and perform determinations; and the second is a machine-assisted manual quality inspection, which mainly includes filtering out detect-free images by a quality inspection system with determination ability, and the images with suspected defects are inspected and determined by the industry experts. Here, the second approach mostly develops from expert systems and feature engineering systems, the experts solidify their experiences in the quality inspection system, and the second approach has certain automation capabilities.

SUMMARY

Embodiments of the present disclosure provide a method and apparatus for inspecting a corrosion defect of a ladle.

In a first aspect, the embodiments of the present disclosure provide a method for inspecting a corrosion defect of a ladle, including: acquiring images from various angles using an image acquisition apparatus inside a to-be-inspected ladle; and inputting the acquired images into a defect inspection system to obtain a first label representing a defect category, the defect inspection system including: a deep convolutional neural network that predicts a category of a corrosion defect of the ladle included in the image based on the input images.

In some embodiments, the defect inspection system includes: a prediction engine and more than one multi-label classification model using the deep convolutional neural network; and the inputting the acquired images into a defect inspection system to obtain a first label representing a defect category includes: converting the acquired images into a classification request using the prediction engine, determining a multi-label classification model for processing the classification request based on a load of the more than one multi-label classification model, and inputting the classification request into the determined multi-label classification model; and performing a multi-label classification calculation via the determined multi-label classification model, to obtain the first label representing the defect category.

In some embodiments, the multi-label classification model includes: a convolution layer, a pooling layer, a fully connected layer, and a classification network; the inputting the classification request into the determined multi-label classification model, and performing a multi-label classification calculation, to obtain the first label representing the defect category includes: inputting the acquired image in the classification request into the convolution layer to obtain an image feature; inputting the image feature into the pooling layer to obtain a dimension-reduced feature; inputting the dimension-reduced feature into the fully connected layer to obtain a global feature; and inputting the global feature into the classification network to obtain the output first label representing the defect category.

In some embodiments, the multi-label classification model is determined based on the following steps: obtaining an image of an inside of the ladle marked with a second label of the defect category; and training a pre-architected initial model using the image of the inside of the ladle marked with the second label of the defect category to obtain the multi-label classification model.

In some embodiments, a loss function of the multi-label classification model is a sum of respective differences between the output first labels and the second labels for marking; and the training a pre-architected initial model using the image of the inside of the ladle marked with the second label of the defect category to obtain the multi-label classification model comprises: when the loss function is smaller than a preset threshold, stopping training the multi-label classification model.

In some embodiments, the method further includes: updating a production database with the acquired images and the first label representing the defect category output by the defect inspection system; determining an updated training database based on the updated production database; and optimizing the deep convolutional neural network based on the updated training database.

In some embodiments, the method further includes: triggering an alarm apparatus to alarm, in response to the first label representing the defect category meeting a preset alarm condition.

In some embodiments, the method further includes: storing a response operation of a user to the alarm as an online production log; and storing the online production log in a production database.

In a second aspect, the embodiments of the present disclosure provide an apparatus for inspecting a corrosion defect of a ladle, including: an image acquisition unit, configured to acquire images from various angles using an image acquisition apparatus inside the to-be-inspected ladle; and an image inspection unit, configured to input the acquired images into a defect inspection system to obtain a first label representing a defect category, the defect inspection system including: a deep convolutional neural network that predicts a category of a corrosion defect of the ladle included in the images based on the input images.

In some embodiments, the defect inspection system in the image inspection unit includes: a prediction engine and more than one multi-label classification model using the deep convolutional neural network; and the image inspection unit includes: an input conversion unit, configured to convert the acquired images into a classification request using the prediction engine, determine a multi-label classification model for processing the classification request based on a load of the more than one multi-label classification model, and input the classification request into the determined multi-label classification model; and a classification calculation unit, configured to perform a multi-label classification calculation via the determined multi-label classification model, to obtain the first label representing the defect category.

In some embodiments, the multi-label classification model in the image inspection unit includes: a convolution layer, a pooling layer, a fully connected layer, and a classification network; the classification calculation unit includes: a request input subunit, configured to input the acquired images in the classification request into the convolution layer to obtain an image feature; a feature dimension reduction subunit, configured to input the image feature into the pooling layer to obtain a dimension-reduced feature; a feature connection subunit, configured to input the dimension-reduced feature into the fully connected layer to obtain a global feature; and a feature classification subunit, configured to input the global feature into the classification network to obtain the output first label representing the defect category.

In some embodiments, the multi-label classification model in the image inspection unit is determined based on the following steps: obtaining an image of an inside of the ladle marked with a second label of the defect category; and training a pre-architected initial model using the image of the inside of the ladle marked with the second label of the defect category to obtain the multi-label classification model.

In some embodiments, a loss function of the multi-label classification model is a sum of respective differences between the output first labels and the second labels for marking; and the multi-label classification model in the image inspection unit is further determined by: when the loss function is smaller than a preset threshold, stopping training the multi-label classification mode.

In some embodiments, the apparatus further includes: a data updating unit, configured to update a production database with the acquired images and the first label representing the defect category output by the defect inspection system; a data determination unit, configured to determine an updated training database based on the updated production database; and a model optimization unit, configured to optimize the deep convolutional neural network based on the updated training database.

In some embodiments, the apparatus further includes: an alarm triggering unit, configured to trigger an alarm apparatus to alarm, in response to the first label representing the defect category meeting a preset alarm condition.

In some embodiments, the apparatus further includes: a log storing unit, configured to store a response operation of a user to the alarm as an online production log; and a data storing unit, configured to store the online production log in a production database.

In a third aspect, the embodiments of the present disclosure provide a device, including: one or more processors; a storage apparatus, storing one or more programs thereon; and the one or more programs, when executed by the one or more processors, cause the one or more processors to implement the method for inspecting a corrosion defect of a ladle according to any one of the above embodiments.

In a fourth aspect, the embodiments of the present disclosure provide a computer readable medium, storing a computer program thereon, the computer program, when executed by a processor, implements the method for inspecting a corrosion defect of a ladle according to any one of the above embodiments.

The method and apparatus for inspecting a corrosion defect of a ladle provided by the embodiments of the present disclosure first acquire images from various angles using an image acquisition apparatus inside the to-be-inspected ladle, and then input the acquired images into a defect inspection system to obtain a label representing a defect category, the defect inspection system including: a deep convolutional neural network that predicts a category of a corrosion defect of the ladle included in the images based on the input images. In this process, since the defect inspection system includes a deep convolutional neural network model, the corrosion defect of the ladle included in the images may be predicted based on the input images, and therefore, the method for inspecting a corrosion defect of a ladle has high safety, high accuracy and high real-time performance for inspecting the ladle status.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
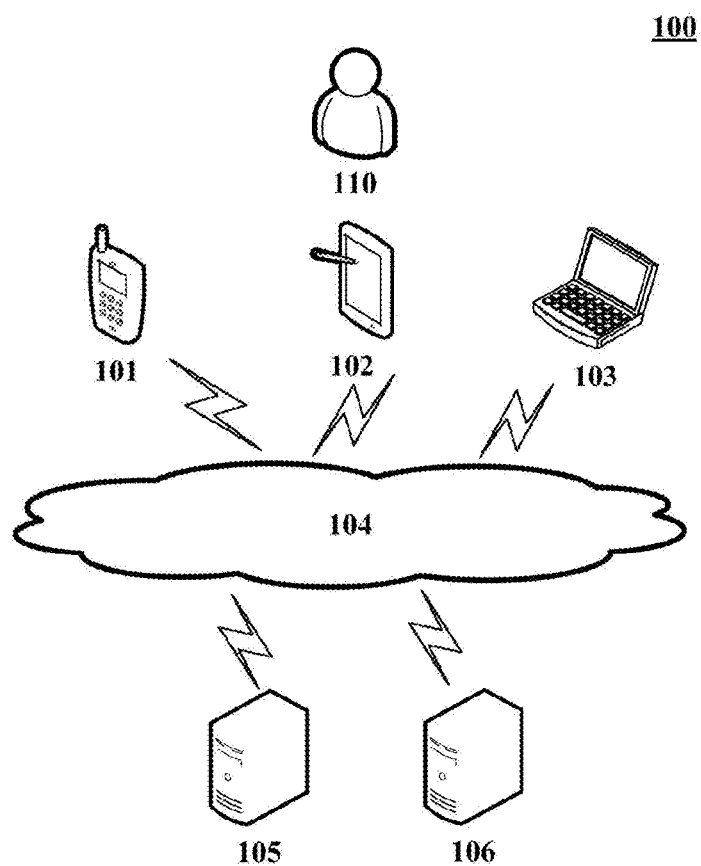
FIG. 1 is an exemplary system architecture to which an embodiment of the present disclosure is applicable.

Referring to FIG. 1, FIG. 1 illustrates an exemplary system architecture 100 of an embodiment of a method for inspecting a corrosion defect of a ladle or an apparatus for inspecting a corrosion defect of a ladle to which the present disclosure is applicable.

As shown in FIG. 1, the system architecture 100 may include terminal devices 101, 102 and 103, a network 104 and servers 105 and 106. The network 104 may be configured to provide a communication link medium between the terminal devices 101, 102 and 103 and the servers 105 and 106. The networks 104 may include various types of connections, such as wired, wireless communication links, or optical fibers.

A user 110 may interact with the servers 105 and 106 via the network 104 using the terminal devices 101, 102 and 103 to receive or transmit messages and the like. Various communication client applications, such as a shooting application, a search engine application, a shopping application, an instant communication tool, a mailbox client, a social platform software, and a video playback application, may be installed on the terminal devices 101, 102, and 103.

The terminal devices 101, 102 and 103 may be hardware or software. The terminal devices 101, 102 and 103 being hardware may be dedicated image acquisition apparatuses or other electronic devices that interact with the server, including but not limited to smart phones, tablets, e-book readers, and MP3 players (Moving Picture Experts Group Audio Layer III), MP4 (Moving Picture Experts Group Audio Layer IV) players, laptop portable computers and desktop computers. The terminal devices 101, 102 and 103 being software may be installed in the above-listed electronic devices, which may be implemented as a plurality of software applications or software modules (e.g., to provide distributed services) or as a single software application or software module, which is not specifically limited in the present disclosure.

The servers 105 and 106 may be servers that provide various services. For example, the servers 105 and 106 may be background servers that provide support to the terminal devices 101, 102 and 103. The background server may process such as analyze, store, or calculate data submitted by the terminal, and push the obtained data processing result to the terminal device.

Generally, the method for inspecting a corrosion defect of a ladle provided by the embodiments of the present disclosure is generally performed by the servers 105 and 106. Accordingly, the apparatus for inspecting a corrosion defect of a ladle is generally provided in the servers 105 and 106.

It should be understood that the number of terminal devices, networks, and servers in FIG. 1 is merely illustrative. Depending on the implementation needs, there may be any number of terminal devices, networks and servers.

Figure 2:
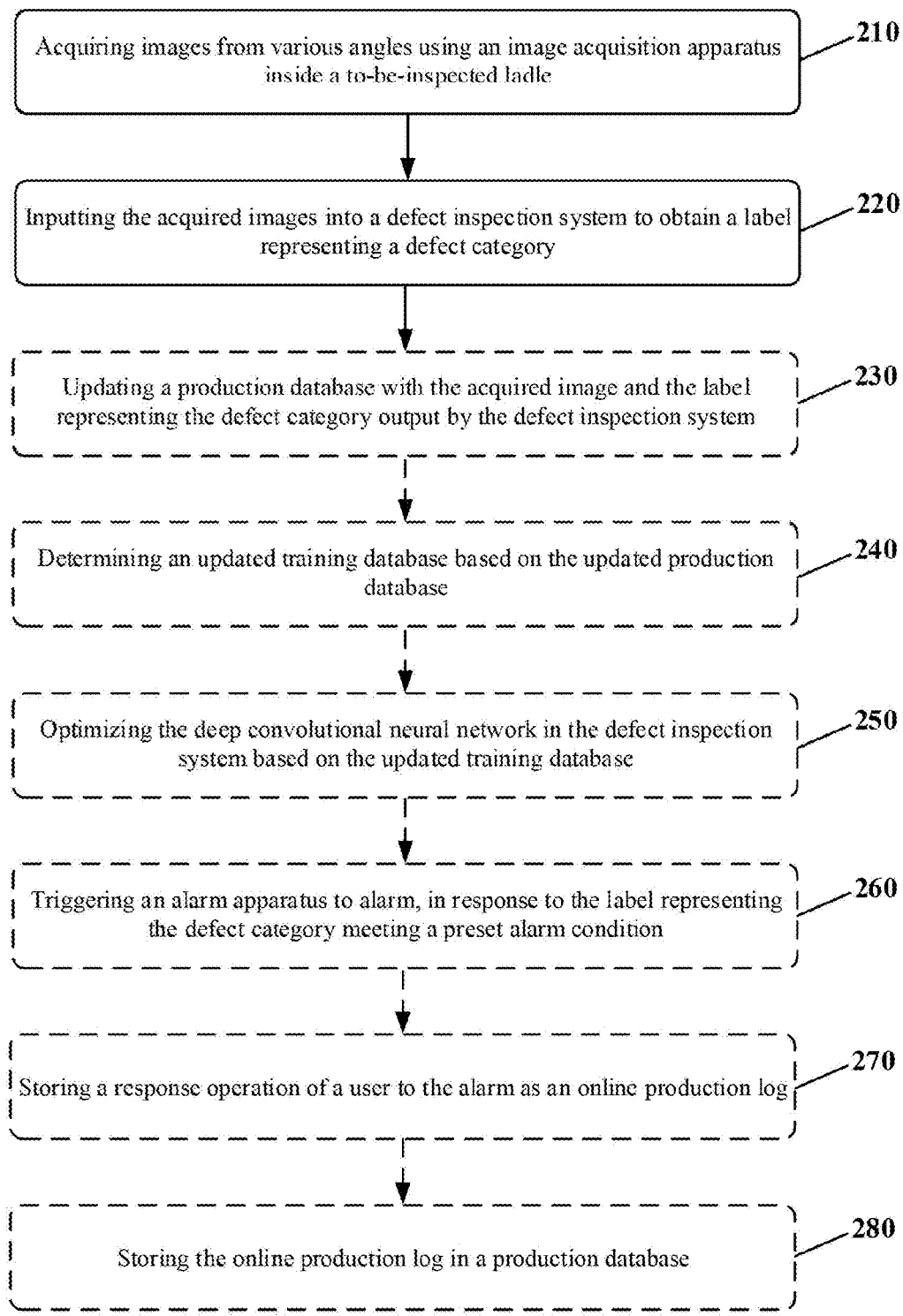
FIG. 2 is a schematic flowchart of an embodiment of a method for inspecting a corrosion defect of a ladle according to the embodiments of the present disclosure.

With further reference to FIG. 2, a schematic flowchart of an embodiment of a method for inspecting a corrosion defect of a ladle according to the embodiments of the present disclosure is illustrated in FIG. 2.

As shown in FIG. 2, a method 200 for inspecting a corrosion defect of a ladle includes steps 210 to 280.

Step 210 includes acquiring images from various angles using an image acquisition apparatus inside a to-be-inspected ladle.

In the present embodiment, an executing body (e.g., the servers 105 and 106 as shown in FIG. 1) of the method for inspecting a corrosion defect of a ladle may receive original acquisition images submitted from the image acquisition apparatus, such as still images or dynamic images acquired at different locations, from multiple angles, etc. These images acquired from various angles may cover all areas of the inner wall of the ladle, leaving no blind angles.

Here, the images acquired from various angles by the image acquisition apparatus may include production environment data, historical accumulated data, general camera acquisition data, dedicated camera acquisition data, manual photograph samples, third party data, and other data.

The image acquisition apparatus here may include a professional high temperature lens assembly and a lens assembly shield, etc. When using the image acquisition apparatus for image acquisition, a group of lens may be used for shooting, or two or more groups of lens may be used for shooting at the same time to shorten the shooting time. The image acquisition apparatus here may alternatively be a video recorder for acquiring single or multiple pictures through the network or 4G.

In a specific example, two groups of lens may be set on the ladle, and each of the group may respectively perform side shooting and bottom shooting to acquire images of the inside of the ladle from various angles.

Step 220 includes inputting the acquired images into a defect inspection system to obtain a label representing a defect category.

In the present embodiment, the defect inspection system includes a deep convolutional neural network. The deep convolutional neural network may predict the category (e.g., red tin, wrinkle, hole, etc.) of the corrosion defect of the ladle included in the image based on the input images. The deep convolutional neural network at least includes more than one convolution layer, more than one pooling layer, one fully connected layer, and one classification network.

Since one image may contain multiple defects of the ladle, one image often corresponds to multiple labels. The problem to be solved by the deep convolutional neural network is a multi-label classification problem. The structure of the network mainly includes a convolutional layer, a pooling layer and a fully connected layer, etc. The original image on the production line is used as an input to the deep convolutional neural network, and the output of the deep convolutional neural network is a label representing a defect category, such as the output labels 0-n, which represent n+1 categories of defects, respectively. A convolution operation scans and convolves the original image or the feature map with convolution kernels of different weights, to extract features of various dimensions and output them to the feature map. A pooling operation performs dimensionality reduction on the feature map, to retain main features in the feature map. The deep neural network model having convolution and pooling operations may have high robustness to deformation, blur, illumination changes, etc. of photos taken on the production line, and have higher generalization for classification tasks.

It should be understood by those skilled in the art that the above deep convolutional neural network model may be a model for predicting a label based on an input image in the existing technology or future development technology, which is not limited in the present disclosure.

In a specific example, the defect inspection system may include: a prediction engine and more than one multi-label classification model using the deep convolutional neural network; and the inputting acquired images into a defect inspection system to obtain a label representing a defect category includes: converting the acquired images into a classification request using the prediction engine, determining the multi-label classification model for processing the classification request based on a load of the more than one multi-label classification model, and inputting the classification request into the determined multi-label classification model; and performing a multi-label classification calculation via the determined multi-label classification model, to obtain the label representing the defect category.

In this example, the prediction engine converts a real-time generated image on the production line into a query, and performs load balancing and scheduling in real time based on the deployment of the online multi-label classification model, and sends the query to the best (e.g., the load is minimal) server equipped with the multi-label classification model. The server runs the multi-label classification model that has been trained by a training engine. After performing preset preprocessing on the image data in the received classification request, the model performs the multi-label classification calculation, and output a prediction result representing the defect category.

Here, the multi-label classification model may be determined based on the following steps: obtaining an image of an inside of the ladle marked with a label of the defect category; and training a pre-architected initial model using the image of the inside of the ladle marked with the label of the defect category to obtain the multi-label classification model. That is, the multi-label classification model is obtained by training based on historical marked data (the image of the inside of the ladle marked with the label of the defect category).

In this example, the defect inspection system implements a load balancing service by setting a prediction engine, and may isolate the intranet that provides the multi-label classification model from the external network that submits the request, and perform health check on the submitted request, thereby improving the safety and usability of the defect inspection system.

Alternatively, in step 230 to step 250, the deep convolutional neural network may be continuously optimized based on the newly generated data during use of the multi-label classification model.

In step 230, a production database is updated with the acquired image and the label representing the defect category output by the defect inspection system.

In step 240, an updated training database is determined based on the updated production database.

In step 250, the deep convolutional neural network of the defect inspection system is optimized based on the updated training database.

By updating the training data based on the updated production data during use and optimizing the deep convolutional neural network based on the updated training data, the accuracy of the deep convolutional neural network to predict the category of the corrosion defect of the ladle may be further improved.

After the multi-label classification model identifies the labels representing the defect categories, further data processing and analysis may be performed on these labels. For example, the method for inspecting a corrosion defect of a ladle may further include an optional step 260.

In the optional step 260, an alarm apparatus is triggered to alarm, in response to the label representing the defect category meeting a preset alarm condition.

For another example, the above method for inspecting a corrosion defect of a ladle may further include an optional step 270 and an optional step 280.

In the optional step 270, a response operation of a user to the alarm may be stored as an online production log.

In the optional step 280, the online production log may be stored in a production database, for further optimization of the deep convolutional neural network based on the data in the production database.

The method for inspecting a corrosion defect of a ladle provided by the above embodiment of the present disclosure may acquire images from various angles using an image acquisition apparatus inside a to-be-inspected ladle, and then input the acquired image into a defect inspection system to obtain a label representing a defect category. Since the defect inspection system includes a deep convolutional neural network that predicts the category of the corrosion defect of the ladle included in the image based on the input image, therefore, the method may improve the safety, accuracy and real-time performance of inspecting the ladle status.

Figure 3:
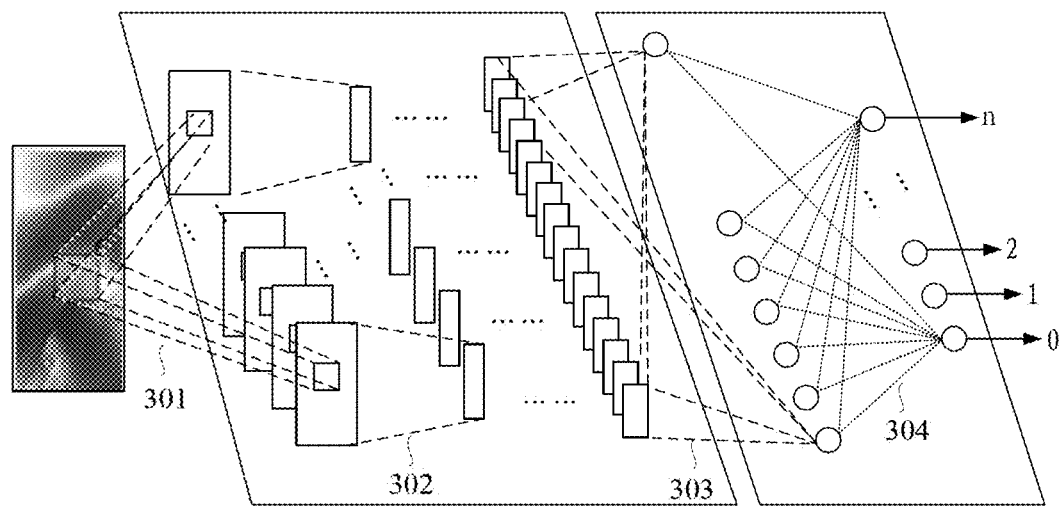
FIG. 3 is an exemplary architecture of a multi-label classification model according to the embodiments of the present disclosure.

Further, with reference to FIG. 3, an exemplary architecture of a multi-label classification model according to the embodiments of the present disclosure is illustrated in FIG. 3.

As shown in FIG. 3, the multi-label classification model may include: a convolution layer 301, a pooling layer 302, a fully connected layer 303, and a classification network 304.

With the multi-label classification model, the classification request may be input into the determined multi-label classification model to perform a multi-label classification calculation to obtain a label representing the defect category by the following steps.

First, the acquired image in the classification request is input into the convolution layer 301 to obtain an image feature.

Then, the image feature is input into the pooling layer 302 to obtain a dimension-reduced feature.

Then, the dimension-reduced feature is input into the fully connected layer 303 to obtain a global feature.

Finally, the global feature is input into the classification network 304 to obtain the output label representing the defect category.

In some alternative implementations of the present embodiment, the multi-label classification model may be determined based on the following steps: first obtaining an image of an inside of the ladle marked with a label of the defect category; and then training a pre-architected initial model using the image of the inside of the ladle marked with the label of the defect category to obtain the multi-label classification model.

Deep neural network models including different depths, different numbers of neurons, and different convolutional pooling modes may be designed as the initial model of the multi-label classification mode based on different production scenarios and data characteristics, and then the model may be trained using labeled historical data, signal forward propagation and error back propagation. The training is stopped when the error value between the output of the model and the label is smaller than a predetermined threshold that meets the service requirements.

In a specific example, a loss function of the multi-label classification model may be the sum of respective differences between the output labels and the labels for marking, and when the loss function is smaller than a preset threshold, the training is stopped.

In this example, the difference between the output label and the marking label corresponding thereto may be calculated first, and the sum of the differences is used as the loss function. That is, the output of the multi-label classification model may be compared with the real label, and the multi-label cross entropy is used as the loss function to quantitatively predict the difference between the label output by the multi-label classification model and the true marking label.

It should be understood that the multi-label classification model shown in FIG. 3 above is only an example of the multi-label classification model and does not represent a limitation on the multi-label classification model. By adopting the multi-label classification model in the present embodiment, the accuracy of the multi-label classification model and the inspection efficiency of the input image may be improved, thereby improving the accuracy and real-time performance of inspecting the ladle status.

Figure 4:
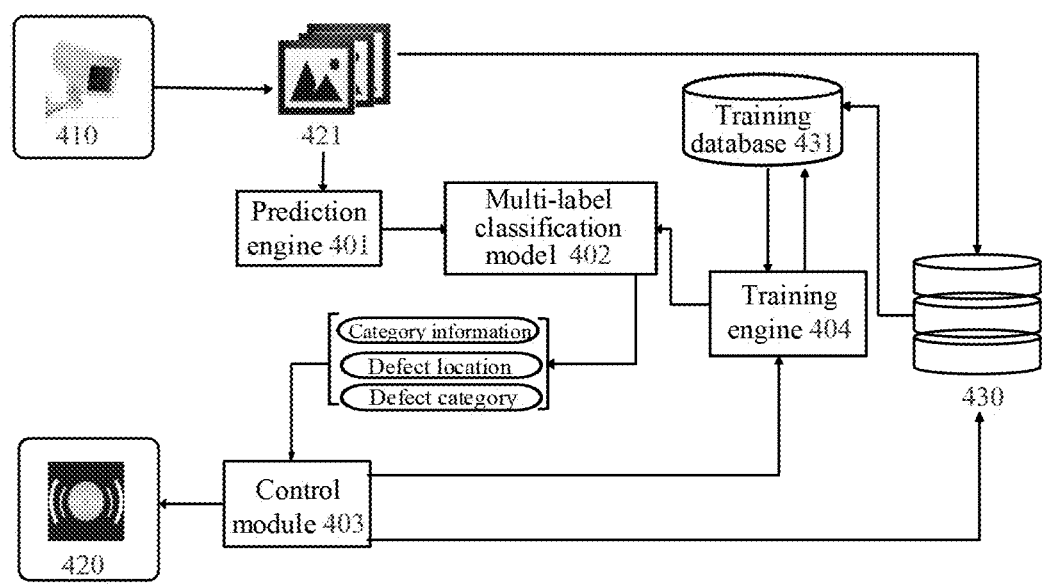
FIG. 4 is an exemplary application scenario of an embodiment of the method for inspecting a corrosion defect of a ladle according to the embodiments of the present disclosure.

Further, with reference to FIG. 4, an exemplary application scenario of the method for inspecting a corrosion defect of a ladle according to the embodiments of the present disclosure is illustrated in FIG. 4.

As shown in FIG. 4, the method for inspecting a corrosion defect of a ladle is implemented based on a defect inspection system including a prediction engine 401, a multi-label classification model 402, a control module 403, and a training engine 404.

In the method for inspecting a corrosion defect of a ladle, the following steps are included:

first, the image acquisition apparatus 410 inside the ladle acquires images from various angles, and stores them to to-be-inspected data 421;

then, the to-be-inspected data 421 is input into the prediction engine 401, and the prediction engine converts the acquired images into a classification request, determines a multi-label classification model for processing the classification request, and inputs the classification request into the determined multi-label classification model 402;

then, the determined multi-label classification model 402 performs a multi-label classification calculation to obtain a label representing the defect category, and sends an inspection result (i.e., a picture category) to the control module 403;

then, the control module 403 triggers an alarm apparatus 420 in response to the label representing the defect category meeting a preset alarm condition, stores a response operation of the user to the alarm as an online production log, and stores the online production log in a production database. Meanwhile, the control module may also trigger the training engine 404 to update the multi-label classification model 402 based on the updated training database 431, based on a preset triggering update rule (e.g., a preset rule for triggering updating the model, such as a predetermined time interval or in response to the number of the inspection result reaching a predetermined number).

The training data in the training database is acquired from the production database 430. The production data in the production database 430 includes the original to-be-inspected data and the production data corresponding to the to-be-inspected data. The production data corresponding to the to-be-inspected data may include: inspection results stored in the production database stored by the control module, and may further include alarm information corresponding to the inspection results, user operations, and the like.

It should be understood that the method for inspecting a corrosion defect of a ladle shown in FIG. 4 is merely an exemplary embodiment of a method for inspecting a corrosion defect of a ladle, and does not represent a limitation on the present disclosure, for example, the image acquisition apparatus and the alarm apparatus in the method may be equipments in the production site of the user. These two equipments may be in communication connection with the client of the user, and then connect to the defect inspection system provided by the cloud server via the public network through the client. For another example, the method may also include a training method of the multi-label classification model. The method may be used in the scene for inspecting a ladle corrosion defect, and the accuracy and efficiency of the inspection result are improved.

Figure 5:
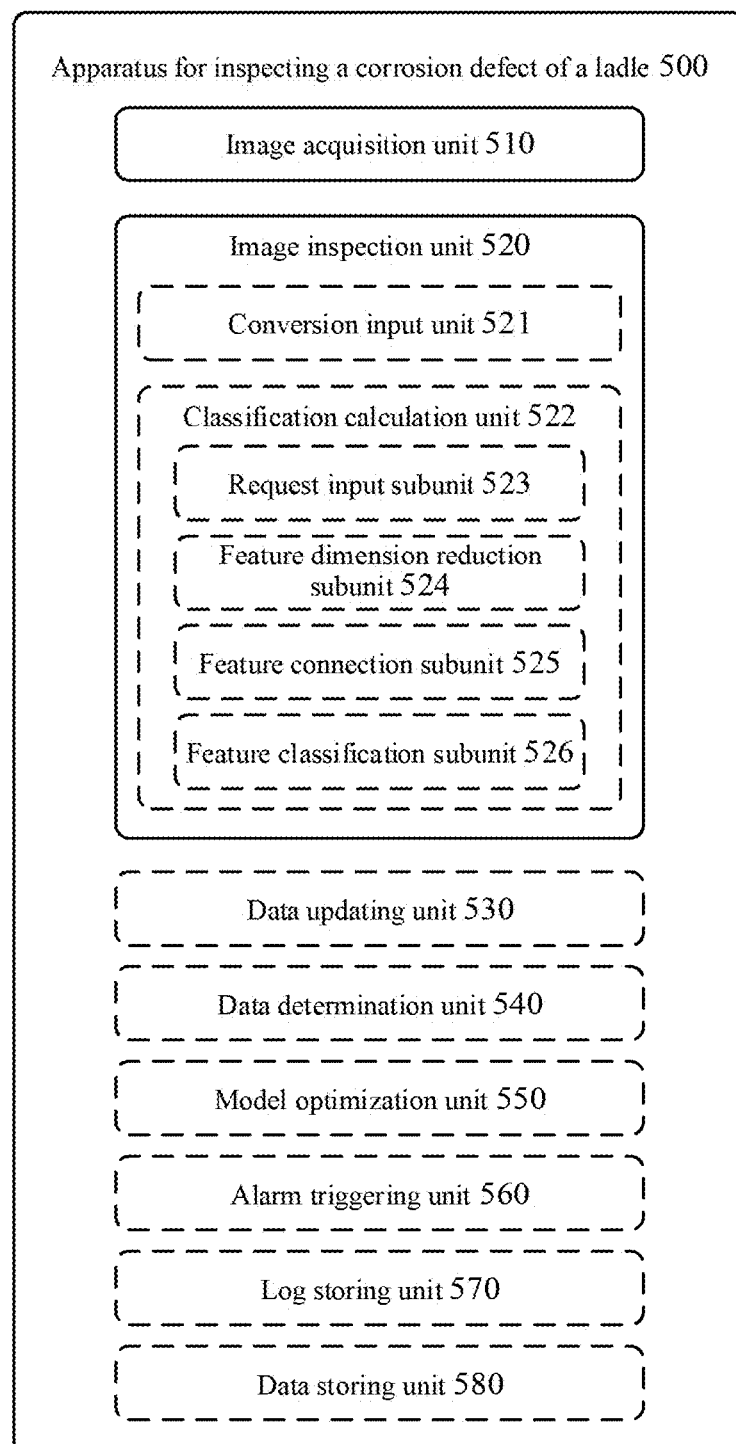
FIG. 5 is an exemplary structural diagram of an embodiment of an apparatus for inspecting a corrosion defect of a ladle according to the embodiments of the present disclosure.

With further reference to FIG. 5, as an implementation of the above method, the embodiments of the present disclosure provides an embodiment of an apparatus for inspecting a corrosion defect of a ladle, and the embodiment of the apparatus for inspecting a corrosion defect of a ladle corresponds to the embodiment of the method for inspecting a corrosion defect of a ladle as shown in FIGS. 1-4, and thus, the operations and features described above for the method for inspecting a corrosion defect of a ladle with respect to FIGS. 1-4 are equally applicable to the apparatus 500 for inspecting a corrosion defect of a ladle and units contained therein, and detailed descriptions thereof will be omitted.

As shown in FIG. 5, the apparatus 500 for inspecting a corrosion defect of a ladle may include: an image acquisition unit 510, configured to acquire images from various angles using an image acquisition apparatus inside a to-be-inspected ladle; and an image inspection unit 520, configured to input the acquired images into a defect inspection system to obtain a label representing a defect category, the defect inspection system including: a deep convolutional neural network that predicts a category of a corrosion defect of the ladle included in the images based on the input images.

In some alternative implementations of the present embodiment, the defect inspection system in the image inspection unit 520 includes: a prediction engine and more than one multi-label classification model using the deep convolutional neural network; and the image inspection unit 520 includes: a conversion input unit 521, configured to convert the acquired images into a classification request using the prediction engine, determine a multi-label classification model for processing the classification request based on a load of the more than one multi-label classification model, and input the classification request into the determined multi-label classification model; and a classification calculation unit 522, configured to perform a multi-label classification calculation via the determined multi-label classification model, to obtain the label representing the defect category.

In some alternative implementations of the present embodiment, the multi-label classification model in the image inspection unit 520 includes: a convolution layer, a pooling layer, a fully connected layer, and a classification network; the classification calculation unit (not shown in the figure) includes: a request input subunit, configured to input the acquired images in the classification request into the convolution layer to obtain an image feature; a feature dimension reduction subunit, configured to input the image feature into the pooling layer to obtain a dimension-reduced feature; a feature connection subunit, configured to input the dimension-reduced feature into the fully connected layer to obtain a global feature; and a feature classification subunit 526, configured to input the global feature into the classification network to obtain the output label representing the defect category.

In some alternative implementations of the present embodiment, the multi-label classification model in the image inspection unit is determined based on the following steps: obtaining an image of an inside of the ladle marked with a label of the defect category; and training a pre-architected initial model using the image of the inside of the ladle marked with the label of the defect category to obtain the multi-label classification model.

In some alternative implementations of the present embodiment, a loss function of the multi-label classification model in the image inspection unit is a sum of respective differences between output labels and the marking labels; and the multi-label classification model in the image inspection unit is determined further based on the following steps: when the loss function is smaller than a preset threshold, stopping training the multi-label classification model.

In some alternative implementations of the present embodiment, the apparatus further includes: a data updating unit 530, configured to update a production database with the acquired image and the label representing the defect category output by the defect inspection system; a data determination unit 540, configured to determine an updated training database based on the updated production database; and a model optimization unit 550, configured to optimize the deep convolutional neural network based on the updated training database.

In some alternative implementations of the present embodiment, the apparatus further includes: an alarm triggering unit 560, configured to trigger an alarm apparatus to alarm, in response to the label representing the defect category meeting a preset alarm condition.

In some alternative implementations of the present embodiment, the apparatus further includes: a log storing unit 570, configured to store a response operation of a user to the alarm as an online production log; and a data storing unit 580, configured to store the online production log in a production database.

The present disclosure also provides an embodiment of a device, including: one or more processors; a storage apparatus, for storing one or more programs; and the one or more programs, when executed by the one or more processors, cause the one or more processors to implement the method for inspecting a corrosion defect of a ladle as described in any one of the preceding embodiments.

The present disclosure also provides an embodiment of a computer readable medium, storing a computer program thereon, the computer program, when executed by a processor, implements the method for inspecting a corrosion defect of a ladle according to any one of the preceding embodiments.

Figure 6:
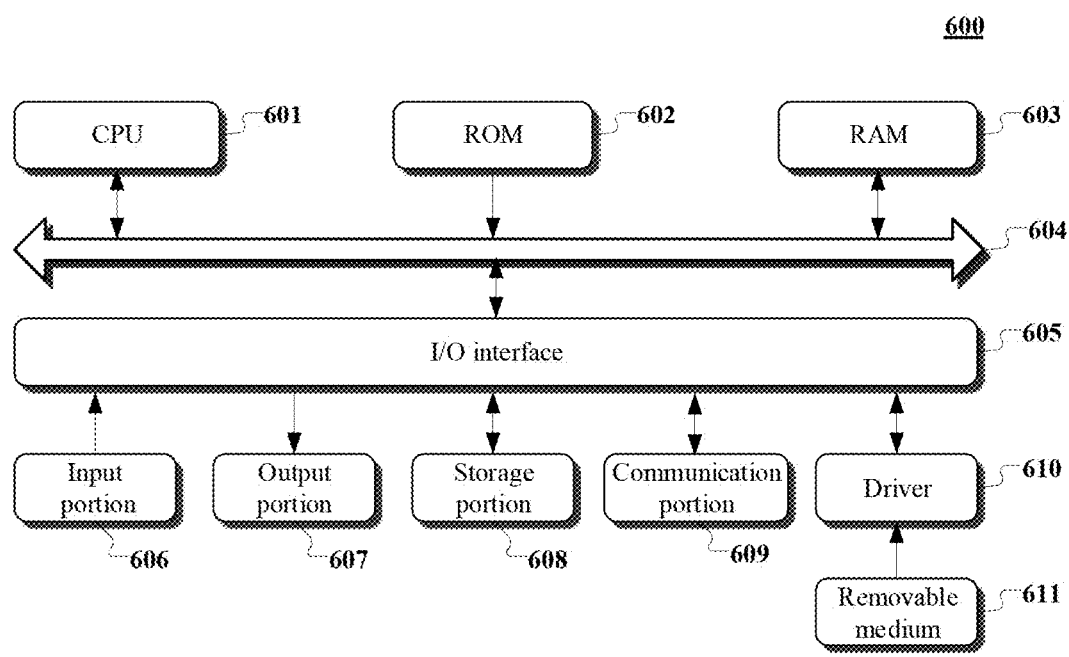
FIG. 6 is a schematic structural diagram of a computer system adapted to implement a terminal device or server of the embodiments of the present disclosure.

With further reference to FIG. 6, a schematic structural diagram of a computer system 600 adapted to implement a terminal device or a server of the embodiments of the present disclosure is shown. The terminal device shown in FIG. 6 is merely an example, and should not limit the function and the scope of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse, etc.; an output portion 607 including a cathode ray tube (CRT), a liquid crystal display device (LCD), a speaker, etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable medium 611. The computer program, when executed by the central processing unit (CPU) 601, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an image acquisition unit and an image inspection unit. Here, the names of these units do not in some cases constitute a limitation to such units themselves. For example, the image acquisition unit may also be described as "a unit for acquiring images from various angles using an image acquisition apparatus inside a to-be-inspected ladle."

In another aspect, the present disclosure further provides a non-volatile computer storage medium. The non-volatile computer storage medium may be included in the apparatus in the above described embodiments, or a stand-alone non-volatile computer storage medium not assembled into the terminal. The non-volatile computer storage medium stores one or more programs. The one or more programs, when executed by a device, cause the device to: acquire images from various angles using an image acquisition apparatus inside a to-be-inspected ladle; input the acquired images into a defect inspection system to obtain a label representing a defect category, the defect inspection system including: a deep convolutional neural network that predicts a category of a corrosion defect of the ladle included in the image based on the input image.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for inspecting a corrosion defect of a ladle, comprising:
   acquiring images from various angles using an image acquisition apparatus inside the to-be-inspected ladle;
   converting the acquired images into a classification request using a prediction engine, determining a multi-label classification model for processing the classification request based on a load of more than one multi-label classification model, and inputting the classification request into the determined multi-label classification model; and
   performing a multi-label classification calculation via the determined multi-label classification model, to obtain a first label representing a defect category, the defect inspection system comprising: a deep convolutional neural network that predicts a category of a corrosion defect of the ladle comprised in the images based on the input images, the prediction engine and the more than one multi-label classification model using the deep convolutional neural network.

2. The method according to claim 1, wherein the multi-label classification model comprises: a convolution layer, a pooling layer, a fully connected layer, and a classification network;
   the inputting the classification request into the determined multi-label classification model, and performing a multi-label classification calculation, to obtain the first label representing the defect category comprises:
      inputting the acquired images in the classification request into the convolution layer to obtain an image feature;
      inputting the image feature into the pooling layer to obtain a dimension-reduced feature;
      inputting the dimension-reduced feature into the fully connected layer to obtain a global feature; and
      inputting the global feature into the classification network to obtain the output first label representing the defect category.

3. The method according to claim 1 wherein the multi-label classification model is determined by:
   obtaining an image of an inside of the ladle marked with a second label of the defect category; and
   training a pre-architected initial model using the image of the inside of the ladle marked with the second label of the defect category to obtain the multi-label classification model.

4. The method according to claim 3, wherein a loss function of the multi-label classification model is a sum of respective differences between the output first labels and the second labels for marking; and
   the training a pre-architected initial model using the image of the inside of the ladle marked with the second label of the defect category to obtain the multi-label classification model comprises: when the loss function is smaller than a preset threshold, stopping training the multi-label classification model.

5. The method according to claim 1, further comprising:
   updating a production database with the acquired images and the first label representing the defect category output by the defect inspection system;
   determining an updated training database based on the updated production database; and
   optimizing the deep convolutional neural network based on the updated training database.

6. The method according to claim 1, further comprising:
   triggering an alarm apparatus to alarm, in response to the first label representing the defect category meeting a preset alarm condition.

7. The method according to claim 6, wherein the method further comprises:
   storing a response operation of a user to the alarm as an online production log; and
   storing the online production log in a production database.

8. An apparatus for inspecting a corrosion defect of a ladle, comprising:
   at least one processor; and a memory storing instructions, wherein the instructions when executed by the at least one processor, cause the at least one processor to perform operations, the operations comprising:

acquiring images from various angles using an image acquisition apparatus inside the to-be-inspected ladle;

converting the acquired images into a classification request using a prediction engine, determining a multi-label classification model for processing the classification request based on a load of more than one multi-label classification model, and inputting the classification request into the determined multi-label classification model; and performing a multi-label classification calculation via the determined multi-label classification model, to obtain a first label representing a defect category, the defect inspection system comprising: a deep convolutional neural network that predicts a category of a corrosion defect of the ladle comprised in the images based on the input images, the prediction engine and the more than one multi-label classification model using the deep convolutional neural network.

9. The apparatus according to claim 8, wherein the multi-label classification model comprises: a convolution layer, a pooling layer, a fully connected layer, and a classification network;

the inputting the classification request into the determined multi-label classification model, and performing a multi-label classification calculation, to obtain the first label representing the defect category comprises:

inputting the acquired images in the classification request into the convolution layer to obtain an image feature;

inputting the image feature into the pooling layer to obtain a dimension-reduced feature;

inputting the dimension-reduced feature into the fully connected layer to obtain a global feature; and inputting the global feature into the classification network to obtain the output first label representing the defect category.

10. The apparatus according to claim 8, wherein the multi-label classification model is determined by:

obtaining an image of an inside of the ladle marked with a second label of the defect category; and training a pre-architected initial model using the image of the inside of the ladle marked with the second label of the defect category to obtain the multi-label classification model.

11. The apparatus according to claim 10, wherein a loss function of the multi-label classification model is a sum of respective differences between the output first labels and the second labels for marking; and the training a pre-architected initial model using the image of the inside of the ladle marked with the second label of the defect category to obtain the multi-label classification model comprises: when the loss function is smaller than a preset threshold, stopping training the multi-label classification model.

12. The apparatus according to claim 8, wherein the operations further comprise:

updating a production database with the acquired images and the first label representing the defect category output by the defect inspection system;

determining an updated training database based on the updated production database; and optimizing the deep convolutional neural network based on the updated training database.

13. The apparatus according to claim 8, wherein the operations further comprise:

triggering an alarm apparatus to alarm, in response to the first label representing the defect category meeting a preset alarm condition.

14. The apparatus according to claim 13, wherein the operations further comprise:

storing a response operation of a user to the alarm as an online production log; and storing the online production log in a production database.

15. A non-transitory computer readable medium, storing a computer program thereon, the computer program, when executed by a processor, causes the processor to perform operations, the operations comprising:

acquiring images from various angles using an image acquisition apparatus inside the to-be-inspected ladle; and converting the acquired images into a classification request using a prediction engine, determining a multi-label classification model for processing the classification request based on a load of more than one multi-label classification model, and inputting the classification request into the determined multi-label classification model; and performing a multi-label classification calculation via the determined multi-label classification model, to obtain a first label representing a defect category, the defect inspection system comprising: a deep convolutional neural network that predicts a category of a corrosion defect of the ladle comprised in the images based on the input images, the prediction engine and the more than one multi-label classification model using the deep convolutional neural network.

* * * * *